April 7, 1942.    R. S. BOYLE    2,278,764
RUBBER FORMING METHOD AND APPARATUS
Filed Aug. 17, 1939    2 Sheets-Sheet 1
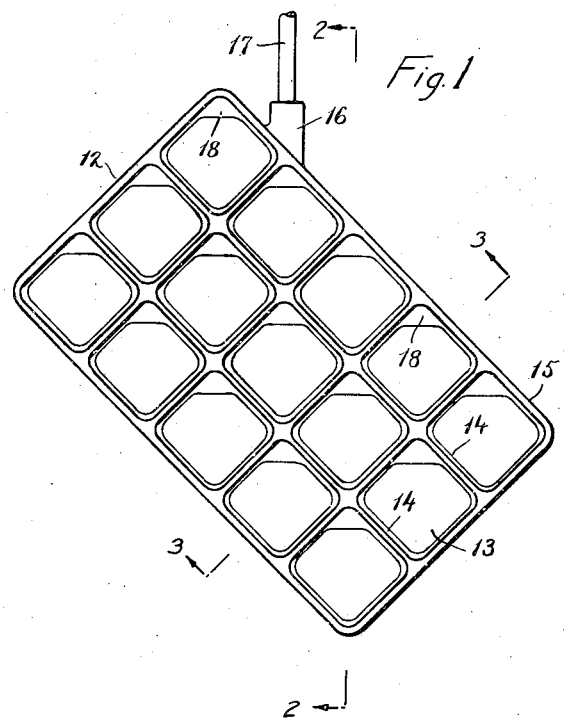
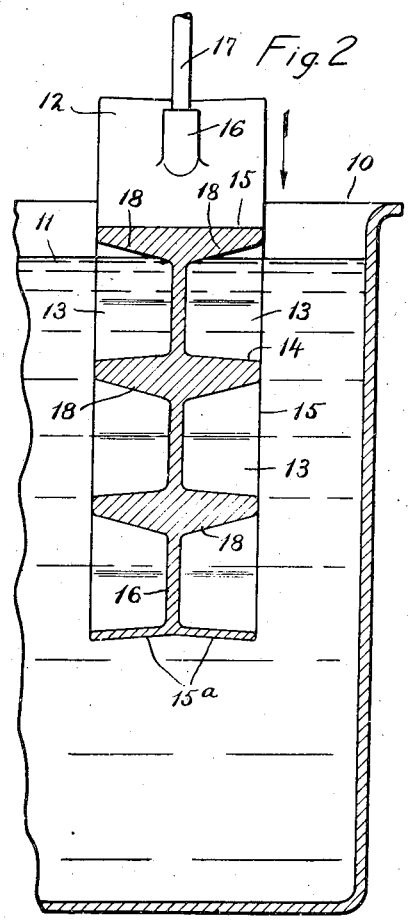
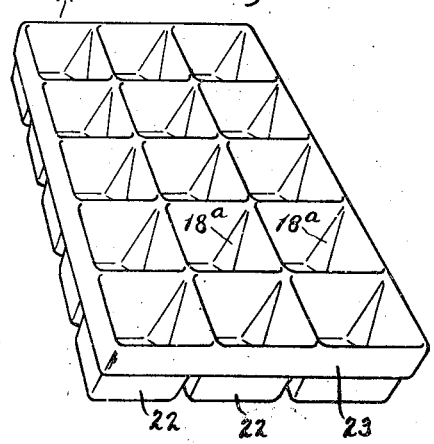
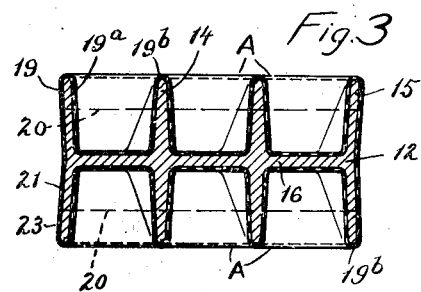
Robert S. Boyle, Inventor,
By Robert M. Pierson,
Attorney

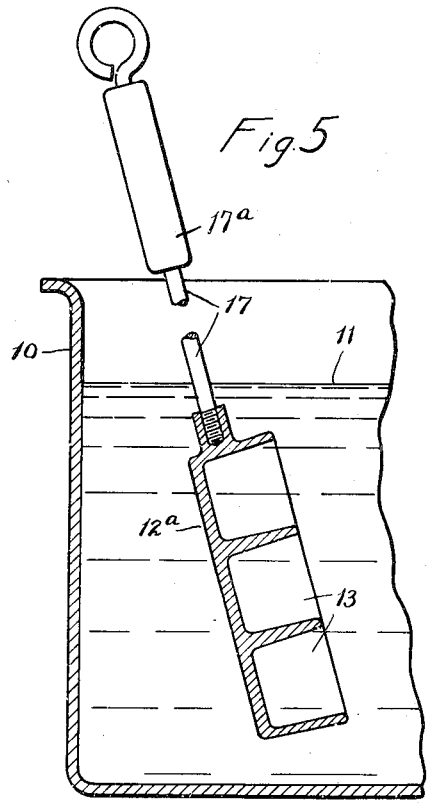
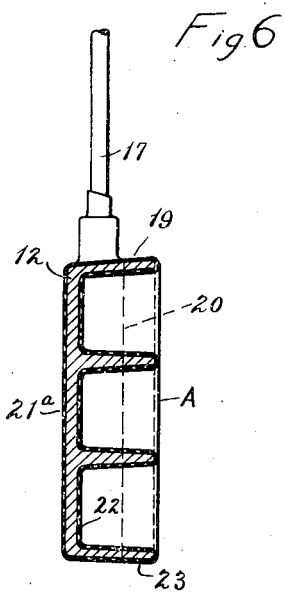
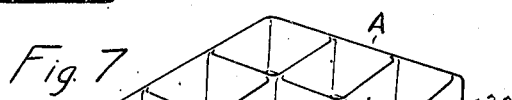
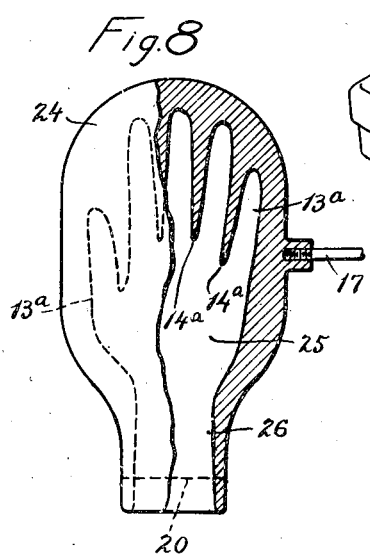

Patented Apr. 7, 1942

2,278,764

UNITED STATES PATENT OFFICE 2,278,764

RUBBER FORMING METHOD AND APPARATUS

Robert S. Boyle, Akron, Ohio

Application August 17, 1939, Serial No. 290,595

2 Claims. (Cl. 18—41)

This invention relates to the art of forming rubber articles and particularly multi-pocketed articles, such as the thin-walled rubber ice-cube freezing tray of the Glomb Patent No. 2,053,711, September 8, 1936, or rubber surgeon's gloves, etc., by a dipping or analogous operation.

The principal object of my invention is to form the individual rubber pockets of such articles in a closely spaced relation, with connecting walls whose thickness is substantially uniform with that of the pocket walls. This requires that the article or its blank shall be formed right-side-out, as a lining on a correspondingly pocketed dipping form, former, mandrel or support which imparts the desired shape to the article. A further object is to provide improved expedients for venting the dipping or supporting former to avoid the trapping of air in the pockets thereof. A still further object is to dip or coat the former on a plurality of sides to increase the output on each dip.

Of the accompanying drawings, Fig. 1 is a side elevation showing a preferred embodiment of my improved dipping former, adapted for making rubber ice-cube freezing trays, in a position for dipping in a tank of latex or rubber solution.

Fig. 2 is a section on the line 2—2 of Fig. 1, showing the former being dipped in the tank.

Fig. 3 is a cross section on the line 3—3 of Fig. 1, showing the dipping former with a pair of connected tray blanks deposited thereon.

Fig. 4 is a perspective view of the completed rubber freezing tray.

Fig. 5 is a vertical section, partly broken away, of a dipping tank showing a modified, one-sided dipping former, immersed therein.

Fig. 6 is a cross section of the modified dipping former, with a rubber tray blank deposited thereon.

Fig. 7 is a perspective view of the product of the modified dipping former.

Fig. 8 is a side elevation, partly in section, showing, as a second modification, a former for making a rubber glove according to my invention.

Referring at first to Figs. 1 to 4 inclusive, 10 is an ordinary dipping tank containing rubber liquid 11 preferably in the form of latex, having a vulcanizing ingredient incorporated therein. 12 is the dipping former, which may be a unit casting of aluminum or other suitable material, in this case of double or two-sided construction and rectangular outline, formed on each side with a set or group of individual pockets 13, separating partitions 14 and a four-sided boundary wall 15, together with a middle floor wall 16 common to the two sets of pockets. The crests of the partitions are very narrow to minimize the spacing of the pockets and thus provide maximum capacity for a given tray area. The number of rows of pockets on each side and the number of pockets in a row may be whatever is desired for the particular tray, the illustration showing three longitudinal rows of five pockets each, in each group. The partition and boundary walls 14, 15 are flared or tapered on their inner sides toward the pocket mouths to permit easy stripping of the finished rubber tray from the former 12 and to fit said tray to a holder grid having correspondingly tapered plate walls for easy individual ejection of ice cubes or blocks by pressing the pocket bottom upwardly as in said Glomb patent. The external faces of the boundary walls 15 are also undercut or tapered backwardly toward the central plane to conform to a similar outer taper on the tray holder.

The former 12 is provided near one corner with a socket 16 for a dipping rod 17 placed diagonally of one of the longer sides and provided at its upper end with a handle (not shown), to hang the former cornerwise, during the dipping operation, with the diagonals of the pockets 13 extending vertically. This permits the lowering of the dipping former cornerwise into the dipping tank with the minimum amount of surface disturbance of the latex or other rubber liquid during immersion. In this position, the tapering of the inclined under sides of the partition and boundary walls facilitates escape of air from the highest corner of each pocket during immersion. To further promote this escape and avoid any air entrapment at said highest corners, especially in the event that the former might be immersed with its plane in a slightly inclined instead of a perfectly vertical position, each upper corner is formed with a triangular fillet 18 connecting the adjoining pocket walls and thickest at its base on the floor wall, to provide an additional and steeper taper along which the air can readily escape from the corresponding pocket 13 above the relatively advancing surface of the liquid as will be evident in the upper part of Fig. 2.

In the operation of the described embodiment, assuming the tank liquid to be rubber latex, the former 12 is preferably first heated and given the usual thin dip coating of absorbent coagulating material which becomes dried thereon, according to the known "American Anode" procedure in latex deposition, and is then dipped for a few seconds in the latex bath 11 by plunging it downwardly while suspended manually or otherwise in a vertical plane in the diagonal or cornerwise position illustrated in Figs. 1 or 2, the pocketed air escaping along the upper corner fillet 18 of each pocket as previously indicated. The coated former is then removed upwardly and momentarily held over the bath for draining back of the excess latex into the latter. This results in a coating 19 of rubber on all surfaces of the former, as indicated in Fig. 3. A single brief dip by the said American Anode method is sufficient, when the coating is dried and vulcanized, to provide rubber walls having a thickness of the order of twenty thousandths of an inch or thereabouts, suitable for a rubber freezing tray of the patented Glomb type. The coating 19 forms right-side-out as a lining 19ª in each pocket of the dipping form, with portions 19ᵇ over the crests of the partitions 14 and boundary walls 15, connecting adjacent pocket linings with each other or connecting those on the outside with the marginal skirt-forming portions.

After draining off the excess rubber liquid, the rubber-coated form is exposed for air drying of the coating for several hours, whereupon, unless the rubber is to be vulianized on the former, the external coating is severed along the parallel lines 20 shown in Fig. 3, leaving a waste strip 21 of rubber between said lines and releasing the two raw rubber trays for stripping from the former 13. The stripped raw trays are then vulcanized in a suitable manner, preferably in a dry-heat oven. The trays could be vulcanized before stripping but this would keep the former out of use for dipping and render the severeing more difficult.

The resulting product is the thin-walled rubber freezing tray A shown in Fig. 4, composed of individual pockets 22 connected by their mouth edges and having an integral marginal skirt portion or band 23 for fitting down over the marginal lip of a metal tray-holding grid. By reason of external under-cutting of the former 12, the free edge of band 23 is the shortest, helping it to lie snugly against the tray holder. One corner of each pocket also has a triangular fillet wall 18ª formed by the corresponding air-venting fillet 18 on the dipping form.

In the modified embodiment illustrated in Figs. 5 to 7, a dipping former 12ª, having pockets 13 on one side only, is provided on one of its longer edges with a handle stem 17 having a handle 17ª, and immersed in the tank bath 11 of latex or an equivalent rubber solution or emulsion while said former is held with its plane in an inclined position to bring the mouths of the pockets 13 on the high side and thus promote air venting of individual pockets during the dip, in which case the corner fillets 18 of the previously-described embodiment may be omitted. The procedure is otherwise similar to that previously described in connection with Figs. 1 to 4. Fig. 6 shows the dipped former with its rubber coating 19. After the coating has been dried on the former, it is severed along the line 20 to waste the external bottom part 21ª and permit stripping of the raw tray, which is then vulcanized in open dry heat. The final product A is shown in Fig. 7, being the same as that of Fig. 4 except for omission of the corner fillets 18ª.

My invention applies also to the manufacture of other rubber articles having one or more pockets, such as surgeons' gloves, whose digits constitute the pockets. In the modification of Fig. 8, 24 is a dipping former of metal or other suitable material having a hand-shaped cavity 25 with a wrist aperture 26 at the mouth end thereof and thumb and finger pockets 13ª at the opposite end, the separating partitions 14ª being relatively thin-edged, together with a handle stem 17 on a side edge of the former. This glove former may be dipped in a rubber liquid bath as previously described, while being held so that the wrist mouth 26 of its cavity is highest to avoid entrapment of air, after which the coated former is reversed, drained and dried, the glove part separated from the waste outer part along a line 20, and the raw glove stripped from the former cavity and vulcanized, in a procedure analogous to those previously described; or the former may be held with the wrist aperture 26 uppermost and the rubber liquid simply poured into said cavity from a pitcher or a pipe, after which the cavity is drained, the coated former dried, and its inner raw glove-shaped coating stripped from the cavity and vulcanized, as will be understood without additional illustration.

Heretofore, as is well known, multi-pocketed rubber dipped goods like surgeons' gloves have been externally deposited on hand-shaped smooth male formers with their finger-forming projections widely spaced in order to avoid excessive thickness of deposited rubber in the crevices. A similar method applied to a rubber freezing tray would so widely space the pockets as unduly to reduce capacity for a given area.

Such objections are avoided by the present invention, which enables production to be increased and provides a superior product. It will be understood that further embodiments could be made and the described procedure otherwise varied within the scope of the attached claims.

I claim:

1. The method of dip-forming a multi-pocketed rubber tray which comprises providing a substantially rectangular dipping former having closely-spaced, substantially rectangular individual pockets, plunging said former, cornerwise thereof, in a bath of rubber liquid, with the pocket diagonals substantially vertical, and upper pocket corners slanted upwardly and outwardly to the pocket mouths for air venting, removing, draining and drying the coated former and vulcanizing the coating.

2. A rectangular dipping form having formed therein a plurality of closely spaced rectangular pockets constituting deposition surfaces, means for so suspending the form as to diagonally dispose said pockets with one corner of each pocket constituting the uppermost deposition surface of its pocket, said one corner being inclined upwardly and outwardly from the bottom of its pocket.

ROBERT S. BOYLE.